April 11, 1961  J. V. SACCONE  2,978,896
COMBINATION HUB CAP AND AIR VALVE LOCK
Filed Aug. 21, 1958
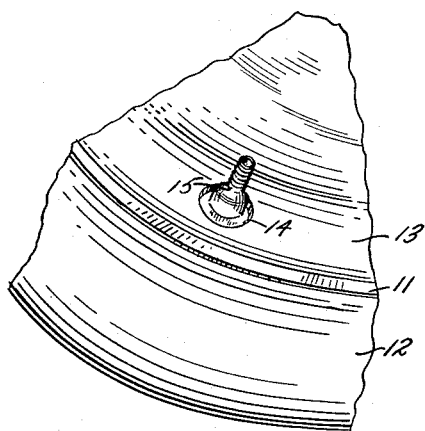
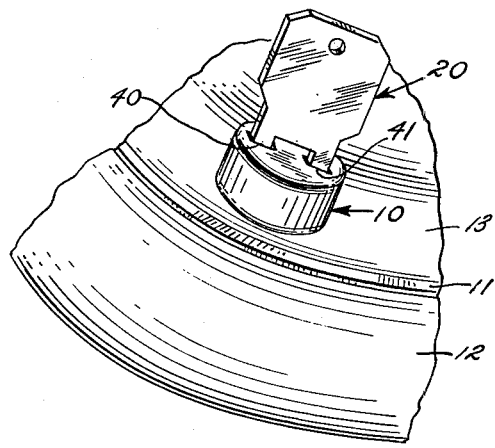
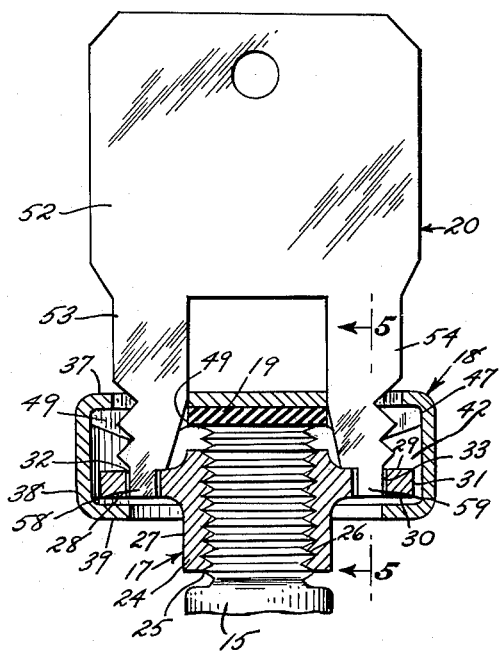
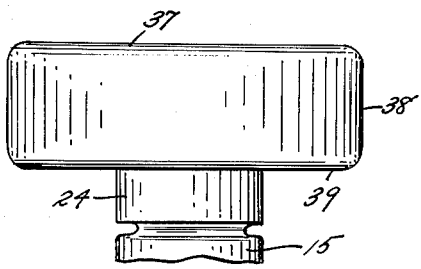
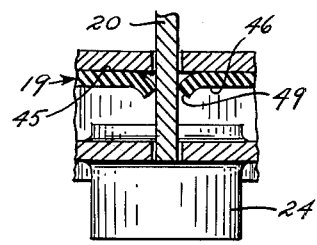
JOHN V. SACCONE
INVENTOR.
BY *Arthur L. Nathanson*
ATTORNEY

United States Patent Office 2,978,896  
Patented Apr. 11, 1961

2,978,896
COMBINATION HUB CAP AND AIR VALVE LOCK

John V. Saccone, Hasbrouck Heights, N.J., assignor, by mesne assignments, to Gemex Precision Metals, Inc., Union, N.J., a corporation of Delaware Filed Aug. 21, 1958, Ser. No. 756,486

2 Claims. (Cl. 70—231)

This invention relates generally to the field of closure devices, and more particularly to an improved construction adapted to simultaneously close an automobile tire valve stem and maintain a hub cap in position upon the felloe of an automobile wheel in such manner as to prevent unauthorized removal either of the closure or the hub cap. Devices of this type are generally known in the art, and the invention relates to specific constructional improvements over prior art constructions.

It is among the principal objects of the present invention to provide an improved locking type closure in which the locking means is concealed from view, so that the type and configuration of the key or tool necessary to remove the device is not readily apparent.

Another object of the invention lies in the provision of a locking closure device of the class described in which the exposed portions thereof are engaged upon the valve stem engaging portions in such manner as to be free spinning in the absence of the necessary tool or key interconnecting the same, thereby eliminating the presence of any structure permitting rotational forcing of the locking mechanism.

Still another object of the invention lies in the provision of combination hub cap and air valve locking construction, in which the cost of fabrication may be of a reasonably low order, thereby permitting consequent wide sale, distribution and use.

Another object of the invention lies in the provision of improved combination hub cap and air valve locking construction, in which each set of devices may be adapted for use with individual key variation, so that the individual sets of devices may be installed or removed only by the holder of the individual key for which such adaption was made.

A feature of the invention lies in the provision of means for sealing the locking means against the entry of dirt and/or water during such time as the device is in installed condition upon a tire valve stem.

These objects and features, as well as other incidental ends and advantages, will more fully ppear in the progress of this disclosure, and be pointed out in the appended claims.

On the drawing, to which reference will be made in the specification, similar reference characters have been employed to designate corresponding parts throughout the several views.

Figure 1 is a fragmentary view in elevation showing a wheel, tire, tire valve stem and hub cap or wheel cover of a type suitable for use in conjunction with the present invention.

Figure 2 is a similar view showing an embodiment of the invention in installed condition on the structure of Figure 1.

Figure 3 is an enlarged elevational view of an embodiment of the device.

Figure 4 is a vertical central sectional view of the embodiment.

Figure 5 is a fragmentary vertical sectional view as seen from the plane 5—5 on Figure 4.

In accordance with the invention, the device, generally indicated by reference character 10 (see Figure 2) is adapted to be used in conjunction with conventional wheel construction of the type shown, for example, in Figure 1, wherein the felloe portion of a wheel 11 mounts a tire 12, the remaining portion of the wheel being covered by a decorative hub cap or wheel cover 13 having an opening 14 therein near the rim portion thereof through which a threaded valve stem 15 projects. The device is shown in installed condition in Figure 2 of the drawing, the device completely overlying the opening 14 and contacting the portion of the outer surface of the hub cap 13 in such manner that the hub cap 13 cannot be removed prior to removal of the device 10.

As best seen in Figure 4 of the drawing, the device 10 comprises broadly a valve stem engaging element 17, an outer shield element 18, a gasket element 19 and a key element 20.

The valve stem engaging element 17 may be formed of machined bar stock, but is preferably die cast using materials capable of maintaining reasonably close dimensions. It includes a cylindrical member 24 having an internal bore 25 provided with threads 26 by means of which the same is engaged upon the valve stem 15. Extending radially from the outer surface 27 is a flange member 28 having an upper surface 29, a lower surface 30 and a peripheral edge surface 31. A pair of bores 32 and 33 extend through the body of the flange member 28, and are spaced radially equidistant from the principal axis of the bore 25.

The outer shield element 18 is preferably formed as a drawing of steel, and includes an upper wall 37, a peripheral circular side wall 38 and a flange lower wall 39. Openings 40 and 41 are radially spaced so as to be capable of overlying the bores 32 and 33. The interior 42 of the outer shield element 18 affords sufficient clearance to permit the element 18 to be freely rotated upon the element 17 after installation of the device upon the valve stem 15.

The gasket element 19 is preferably of live rubber, neoprene, or the like, and includes an upper surface 45 and a lower surface 46. The gasket element 19 seals the openings 40 and 41. The peripheral edge 47 lies against the inner surface of the peripheral wall 38. A pair of slits 49 are disposed beneath the opening 40 and 41, the same being expendable with the insertion of the key element 20 therethrough.

The key element 20 may be formed as a sheet metal stemping, and includes a base member 52, and first and second engaging members 53 and 54, respectively. The engaging members 53 and 54 are similar, and spaced apart from each other a distance to permit simultaneous entry into the openings 40 and 41. Spaced projections 58 and 59 are disposed on the free ends of the engaging members 53 and 54 a distance apart which corresponds to the bores 32 and 33, this distance being variable to permit different configurations of keys.

To remove a device 10 when in installed condition, the key element is inserted into the openings 40 and 41, causing distortion of the slit openings 49 as indicated in Figure 5, following which the key is rotated while gently pressing axially against the upper surface 29 of the valve stem engaging element 17 until the bores 32 and 33 are engaged. While maintaining the axial pressure, the device may then be rotated upon the threads 26 to remove the same from engagement with the valve stem 15.

It will be apparent that with the slit openings 49 in closed condition, the location of the bores 32 and 33 cannot be observed, nor can the effective diameter of the same be seen by a potential thief. Further, the insertion of tools into the openings 40 and 41, alone, afford no means for removing the device, so that a definite technique in engaging the bores 32 and 33 is required.

I wish it to be understood that I do not consider the invention limited to the precise details of structure shown and set forth in this specification, for obvious modifications will occur to those skilled in the art to which the present invention pertains.

I claim:

1. In an air valve closure device for use in conjunction with a tire valve stem, said closure including a valve stem engaging element, a flange member integral with and extending radially from said element in a plane substantially normal to said valve stem, the flange member having a plurality of bores extending therethrough, and an outer shield element freely rotatable with respect to said valve stem engaging element and having a plurality of alignable openings overlying said bores and a key element selectively engageable with said plurality of openings for preventing relative rotational movement between said valve stem engaging element and said outer shield element, the improvement comprising: resilient gasket means disposed between said valve stem engaging element and said outer shield element for resiliently closing the openings in said outer shield element, said gasket means having resiliently expandable slits underlying the openings in said outer shield element, said slits having straight parallel side walls normally contiguous along their entire lengths when said key element is disengaged therefrom, and surrounding said key element when the latter is in engagement with said outer shield element; said valve stem engaging element having a threaded bore extending therethrough, said slits in said gasket means being laterally displaced with respect to the principal axis of said valve stem engaging element, whereby said gasket means may form an inner seal upon the end portion of said valve stem.

2. In an air valve closure device for use in conjunction with a tire valve stem, said closure including a valve stem engaging element, a flange member integral with and extending radially from said element in a plane substantially normal to said valve stem, the flange member having at least one bore extending therethrough, and an outer shield element freely rotatable with respect to said valve stem engaging element and having at least one alignable opening overlying said bore and a key element selectively engageable with said opening for preventing relative rotational movement between said valve stem engaging element and said outer shield element, the improvement comprising: resilient gasket means disposed between said valve stem engaging element and said outer shield element for resiliently closing the opening in said outer shield element, said gasket means having at least one resiliently expandable slit underlying the opening in said outer shield element, said slit having straight parallel side walls normally contiguous along their entire lengths when said key element is disengaged therefrom, and surrounding said key element when the latter is in engagement with said outer shield element; said valve stem engaging element having a threaded bore extending therethrough, said slit in said gasket means being laterally displaced with respect to the principal axis of said valve stem engaging element, whereby said gasket means may form an inner seal upon the end portion of said valve stem.

References Cited in the file of this patent

UNITED STATES PATENTS

| 427,423 | Johnson | May 6, 1890 |
| 1,685,924 | Lee | Oct. 2, 1928 |
| 2,778,215 | Redmond | Jan. 22, 1957 |

FOREIGN PATENTS

| 794,863 | Great Britain | May 14, 1958 |